US012671953B2

(12) United States Patent
Jia et al.

(10) Patent No.: US 12,671,953 B2
(45) Date of Patent: Jun. 30, 2026

(54) MUSIC COLLABORATION USING VIRTUAL CONFERENCING

(71) Applicant: Zoom Video Communications, Inc., San Jose, CA (US)

(72) Inventors: Zhaofeng Jia, Saratoga, CA (US); Qiyong Liu, Singapore (SG); Mengfan Zhang, Mountain View, CA (US); Xiangming Zhu, Anhui (CN)

(73) Assignee: Zoom Communications, Inc., San Jose, CA (US)

( * ) Notice: Subject to any disclaimer, the term of this patent is extended or adjusted under 35 U.S.C. 154(b) by 343 days.

(21) Appl. No.: 17/966,996

(22) Filed: Oct. 17, 2022

(65) Prior Publication Data

US 2024/0129685 A1 Apr. 18, 2024

(51) Int. Cl.
*H04S 7/00* (2006.01)
*H04L 65/403* (2022.01)
*H04S 3/00* (2006.01)

(52) U.S. Cl.
CPC ........... *H04S 7/303* (2013.01); *H04L 65/403* (2013.01); *H04S 3/008* (2013.01); *H04S 7/305* (2013.01); *H04S 2400/01* (2013.01); *H04S 2400/11* (2013.01); *H04S 2400/15* (2013.01); *H04S 2420/01* (2013.01)

(58) Field of Classification Search
CPC .......... H04S 7/303; H04S 7/305; H04S 3/008; H04S 2400/01; H04S 2400/11; H04S 2400/15; H04S 2420/01; H04L 65/403

USPC ......................................... 381/303, 306, 310
See application file for complete search history.

(56) References Cited

U.S. PATENT DOCUMENTS

| | | | | |
|---|---|---|---|---|
| 10,003,901 B1 * | 6/2018 | Slick | ......................... | H04S 7/30 |
| 11,714,595 B1 * | 8/2023 | Libin | ....................... | H04N 7/15 |
| | | | | 704/235 |
| 2011/0026745 A1 * | 2/2011 | Said | ........................ | H04S 1/002 |
| | | | | 381/310 |
| 2017/0287457 A1 * | 10/2017 | Vorobyev | ............. | G10H 1/0033 |
| 2017/0374486 A1 * | 12/2017 | Killham | ................... | H04R 5/02 |
| 2020/0186576 A1 * | 6/2020 | Gopal | ................. | H04L 65/1083 |
| 2021/0321212 A1 * | 10/2021 | Li | ............................ | H04S 7/304 |
| 2023/0262169 A1 * | 8/2023 | Mosebrook | ........... | H04M 3/569 |
| | | | | 700/94 |
| 2023/0370801 A1 * | 11/2023 | Onishi | ................... | H04N 7/152 |

* cited by examiner

*Primary Examiner* — William A Jerez Lora
(74) *Attorney, Agent, or Firm* — Kilpatrick Townsend & Stockton LLP

(57) ABSTRACT

One example method for music collaboration using virtual conferencing includes receiving, by a client device, audio streams associated with a plurality of musicians in a virtual conference, each musician assigned to a virtual position within a virtual space established by the virtual conference, the client device associated with a participant in the virtual conference, the participant having a participant virtual position within the virtual space; determining relative virtual positions of each musician of at least a subset of the plurality of musicians in the virtual conference with respect to the participant virtual position; generating a plurality of spatialized audio streams based on the relative virtual positions of the respective musicians and the respective audio streams; and outputting the spatialized audio streams.

20 Claims, 15 Drawing Sheets

VIRTUAL VENUE 400

MUSICIAN POSITIONS 412

AUDIENCE POSITIONS 422

PERFORMANCE SPACE 410

AUDIENCE SPACE 420

TYPE MESSAGE

640

602

604

600

610    612    620    622    624    626    628    630    632

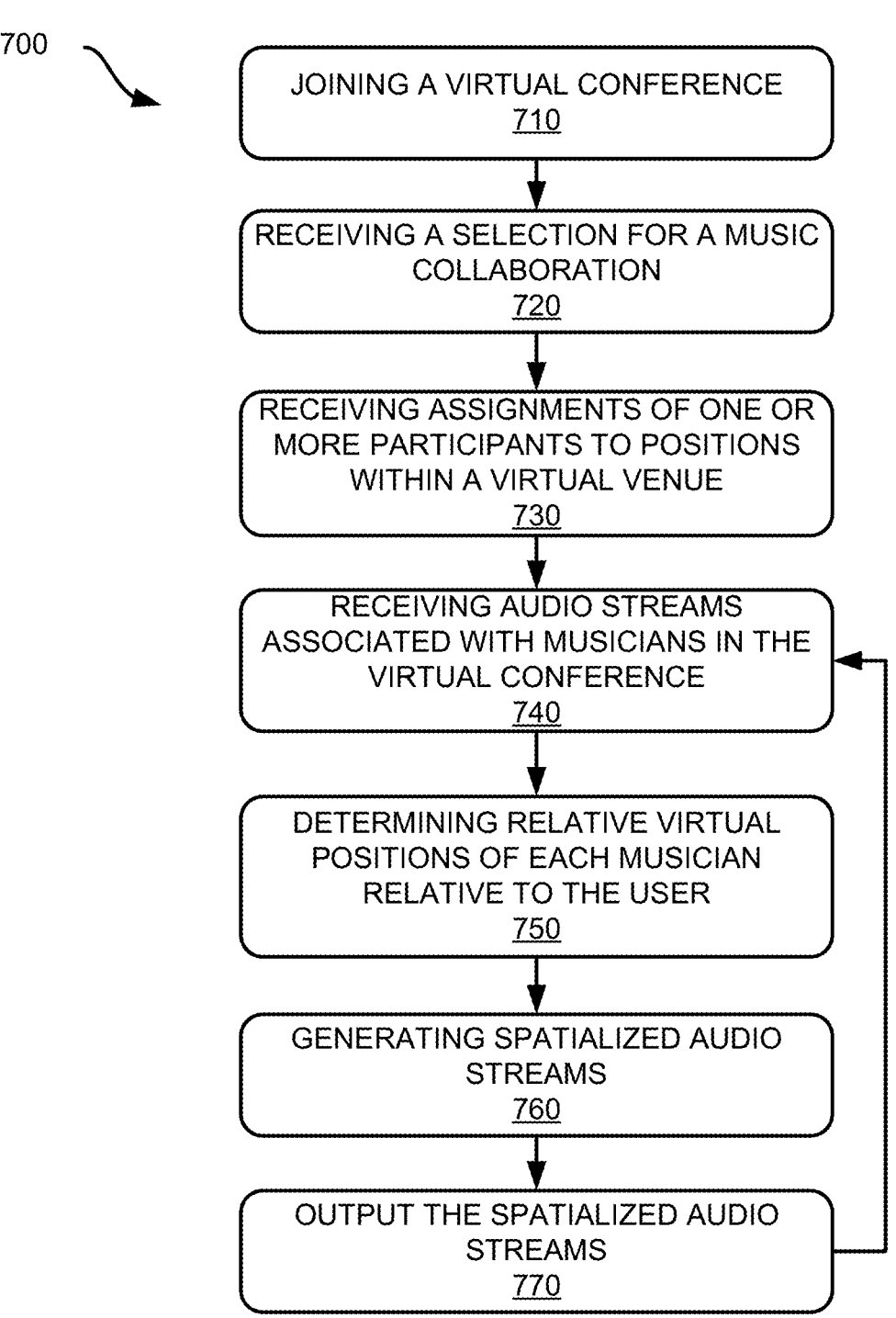

700

JOINING A VIRTUAL CONFERENCE
710

RECEIVING A SELECTION FOR A MUSIC
COLLABORATION
720

RECEIVING ASSIGNMENTS OF ONE OR
MORE PARTICIPANTS TO POSITIONS
WITHIN A VIRTUAL VENUE
730

RECEIVING AUDIO STREAMS
ASSOCIATED WITH MUSICIANS IN THE
VIRTUAL CONFERENCE
740

DETERMINING RELATIVE VIRTUAL
POSITIONS OF EACH MUSICIAN
RELATIVE TO THE USER
750

GENERATING SPATIALIZED AUDIO
STREAMS
760

OUTPUT THE SPATIALIZED AUDIO
STREAMS
770

*FIG. 7*

MUSIC COLLABORATION USING VIRTUAL CONFERENCING

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 shows an example method for music collaboration using virtual conferencing.

DETAILED DESCRIPTION

Figure 1:
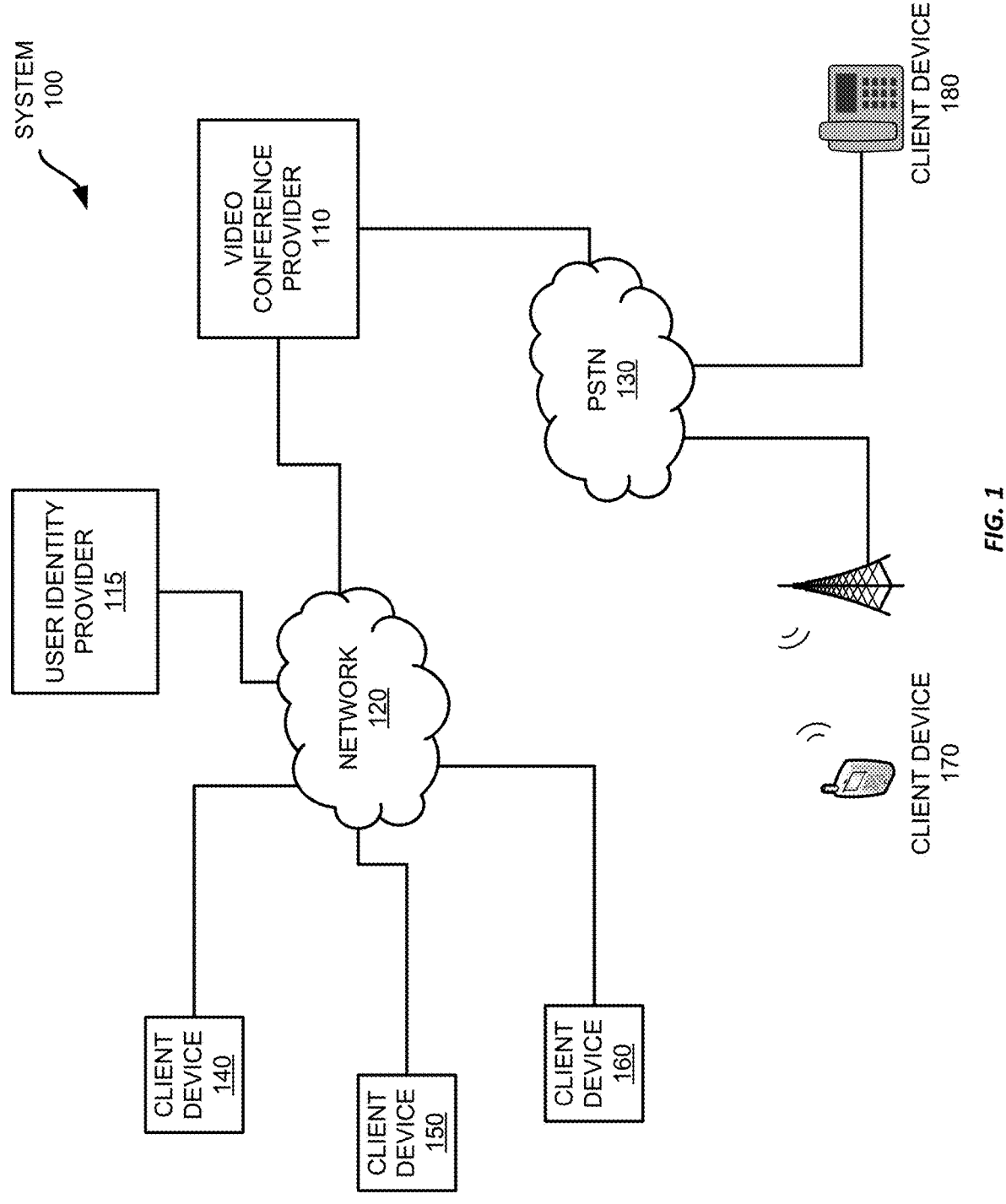
FIGS. 1-2 show example systems for music collaboration using virtual conferencing.

Examples are described herein in the context of music collaboration using virtual conferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People gather together for many reasons, but one common reason for gathering is to practice music together, whether as a part of a band, a string quartet, or a full orchestra. Musicians will gather at a common location and practice or perform various musical pieces, sometimes in front of an audience. However, it can be difficult under some circumstances for musicians to physically gather at the same location. This can be due to the musicians living long distances from each other or to other issues like the COVID-19 global pandemic that limit the ability of people to gather together.

However, one option for musicians is to use virtual conference client software (or "client software") to join and gather virtually within a virtual conference. During a virtual conference, participants may engage with each other to discuss any matters of interest, but can also play musical instruments and hear the other participants playing. Typically, such participants will interact in a virtual conference using a camera and microphone, which provides video and audio streams (each a "media" stream; collectively "multimedia" streams) that can be delivered to the other participants by the virtual conference provider and be displayed via the various client devices' displays or speakers. Thus, a group of musicians located in different parts of the world can all join a virtual conference and, via their own client devices, play their instruments together (referred to as a "music collaboration"). In addition, the musicians can invite friends, family, or anyone interested to join and listen to them play.

However, a difficulty with doing so is that the participants in the virtual conference may not have the same sense of being physically present with each other because all of the various instruments will sound as though they are playing at the same location. In addition, a typical virtual conference presents each person in their own individual position within a graphical user interface ("GUI") provided by the client software, but without any sense of being collected together in a common space. For the musicians, this can make playing difficult because the sounds from the other instruments may blend together because their sounds all apparently come from the same location. And for the audience, the performance may be less compelling because there is little to no sense of being at a live performance.

To help provide a more realistic environment to play instruments with other people or to listen to a virtual musical performance, a host of a meeting may select a virtual venue for the music collaboration, such as a virtual recording studio, a virtual concert hall, or other virtual space. Each musician may then be assigned to a virtual location within the virtual venue.

The client software will use the virtual locations of the various musicians to process incoming audio streams and output spatialized audio to its user. Thus, if a musician is sitting in the midst of a violin section of an orchestra on the left side of the stage, they will be surrounded by other violins and hear each other violinist based on their respective virtual positions with respect to the users' virtual positions. Other musicians in other portions of the orchestra will also provide audio streams, which will be similarly processed and output to the user. Thus, the user will perceive themself as being among the violinists and distant from the woodwinds, and each different audio stream will apparently come from the direction of the respective musician. Thus, the user will feel as if they are playing within a live orchestra.

In addition, the client software may also receive information about the venue where the orchestra is playing. The information may include a physical layout of the performance area, e.g., the stage, and information about sound propagation within the performance area. The client software can use this information to add effects to the audio streams, such as echoes or reverberations within the space. This may provide a highly realistic virtual experience of paying within a live orchestra.

Similarly, an audience member may also observe the performance from a virtual position within a virtual concert hall. The audio streams of the various musicians may then be similarly processed as for one of the musicians, including adding audio effects based on the shape and acoustic properties of the concert hall. Thus, the audio streams output by the user's client software will sound as though they are from a live performance in a concert hall, rather than in a virtual performance by various musicians playing in their own respective homes or studios.

Such functionality can help create the illusion of participating in or viewing a live performance for each of the users participating in the virtual concert. In addition, such functionality can provide amateur musicians the option of "joining" the orchestra for a performance and experience the feeling of playing amidst a professional orchestra if they select an option to join as a "silent" musician, where their audio streams are not provided as part of the performance, but they assume a virtual position within the orchestra.

This illustrative example is given to introduce the reader to the general subject matter discussed herein and the disclosure is not limited to this example. The following sections describe various additional non-limiting examples and examples of systems and methods for music collaboration using virtual conferencing.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
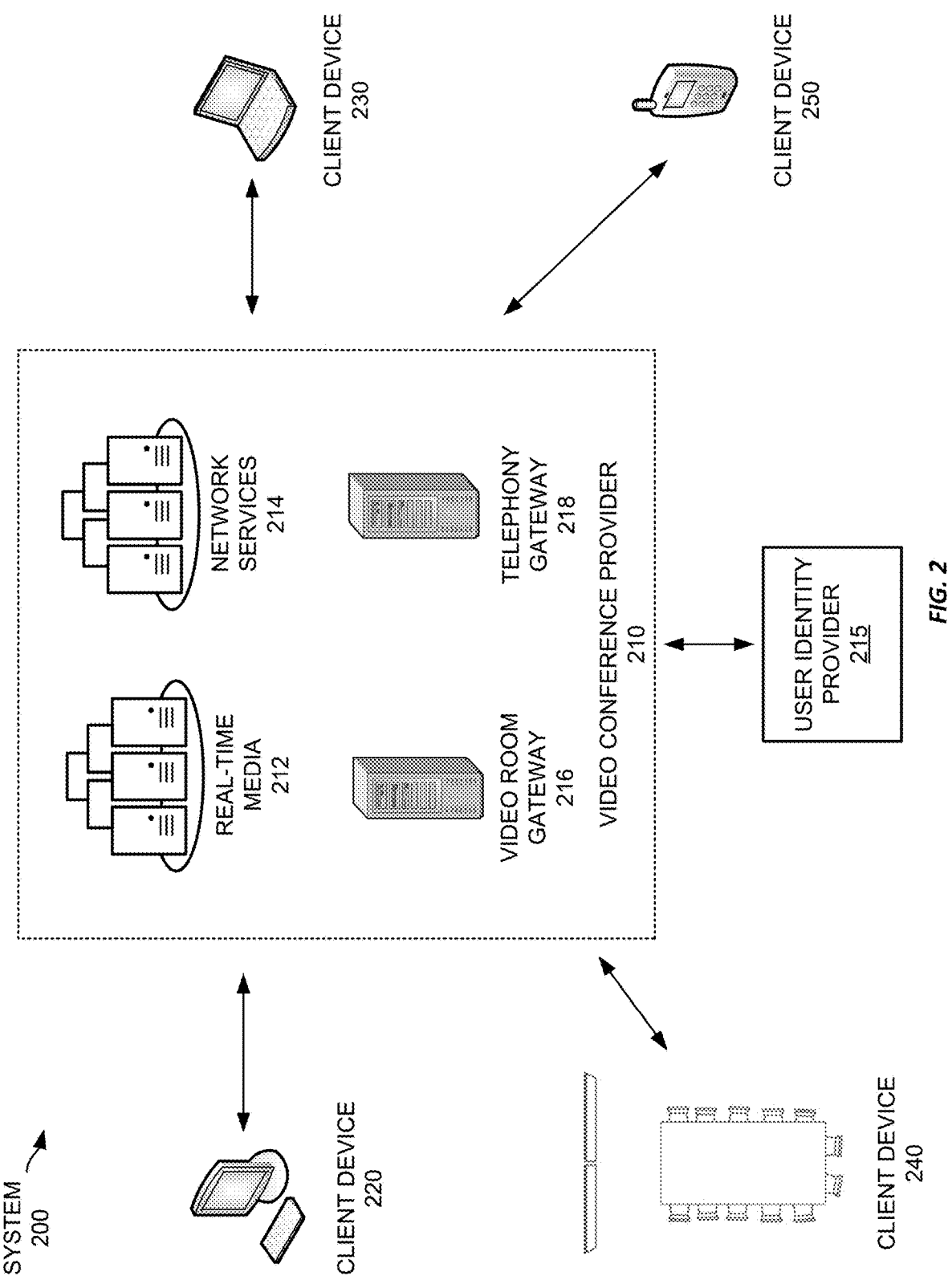

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
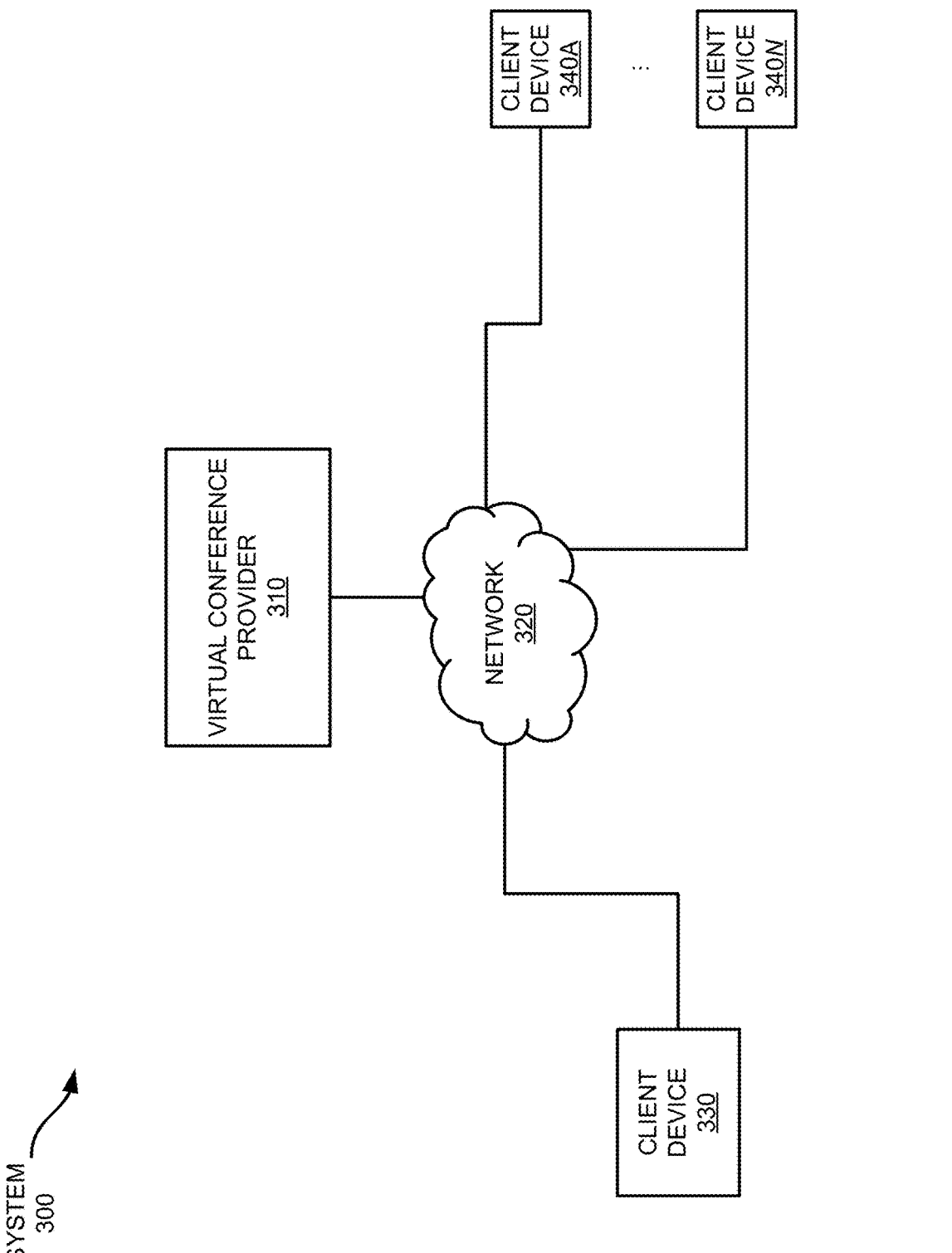
FIGS. 3A-3B show an example system for music collaboration using virtual conferencing.
Figure 3B:
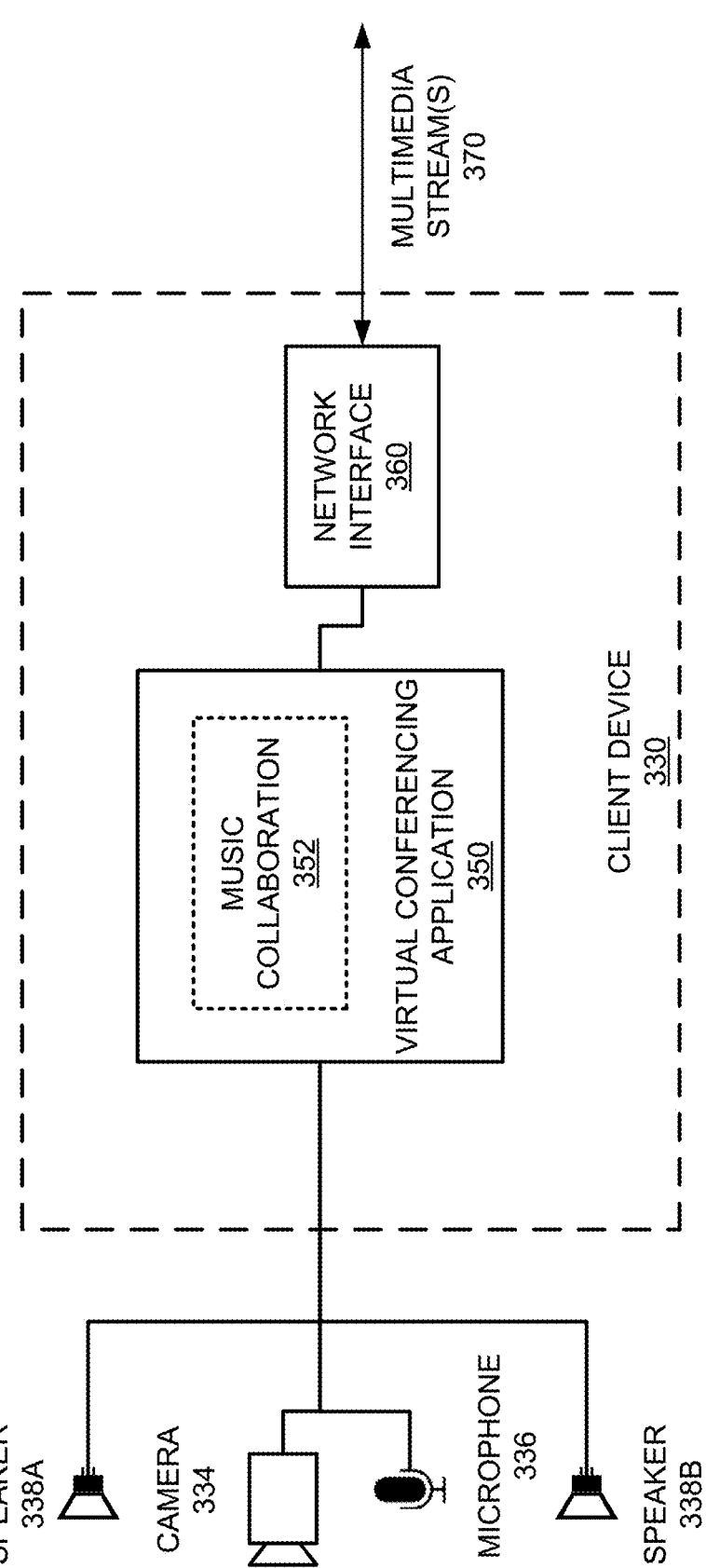

Referring now to FIGS. 3A-3B, FIG. 3A shows an example system 300 for music collaboration using virtual conferences. The system 300 includes a virtual conference provider 310, which can be connected to multiple client devices 330, 340*a-n* via one or more intervening communication networks 320. In this example, the communications network 320 is the internet, however, any suitable communications network or combination of communications network may be employed, including LANs (e.g., within a corporate private LAN), WANs, etc.

Each client device 330, 340*a-n* executes virtual conference software that connects to the virtual conference provider 310 and joins a meeting. During the meeting, the various participants (using virtual conference software or "client software" at their respective client devices 330, 340*a-n*) are able to interact with each other to conduct the meeting, such as by viewing video feeds and hearing audio feeds from other participants, and by capturing and transmitting video and audio of themselves.

Client device 330, 340*a-n* may join virtual conferences hosted by the virtual conference provider 310 by connecting to the virtual conferences provider and joining a desired virtual conference, generally as discussed above with respect to FIGS. 1-2. Once the participants have joined the conference, they may interact with each other by exchanging audio and video feeds. In some cases where a virtual conference is directed to a music collaboration, the host, using client device 330 in this example, may select a virtual environment for the musicians and assign locations to each musician. The assignments may be made in advance in some examples, or after the musicians have joined the virtual conference. Similarly, participants joining the virtual conference may join as audience members and be similarly positioned within the virtual environment, such as in a region designated for the audience. In some examples, audience members may select their own position within the audience region, or change their position during the virtual performance. In addition, multiple different audience members may select the same virtual position, which may allow the audience to perceive the music collaboration from their own ideal viewing location.

After assigning virtual positions for the various musicians and the members of the audience, those positions may be provided to the various participants' client devices, e.g., client devices 340*a-n*, which may use the position information to generate spatialized audio for the music collaboration, which will be described in more detail below.

Referring now to FIG. 3B, FIG. 3B shows an example client device 330 from FIG. 3A. The client device 330 executes a software client, referred to as the virtual conferencing application 350 in this example. The virtual conferencing application 350 receives audio and video data from a microphone 336 and a camera 334, respectively, connected to the client device 330. During a virtual conference, the virtual conferencing application 350 encodes the received audio and video data and transmits them to the network as multimedia streams 370 using a network interface 360. In addition, the virtual conferencing application 350 receives multimedia streams 370 from the virtual conference provider, which were initially generated by other client devices, e.g., client device 340*a-n*, participating in the virtual conference.

In this example, the client device 330 is operated by the host of a virtual conference who configures the virtual conference to be a music collaboration. For example, the host may select an option when initially configuring the virtual conference, before inviting other participants. In other examples, the host may select an option during a virtual conference to create a music collaboration.

After configuring the virtual conference as a music collaboration, the host may select a suitable venue from a collection of available venues. The available venues may be provided by the virtual conference provider 310 or available from a third party. The venues may provide a virtual three-dimensional space within which the participants are positioned. The host may then assign participants to specific positions within the space, or the participants may select positions for themselves.

Figure 4A:
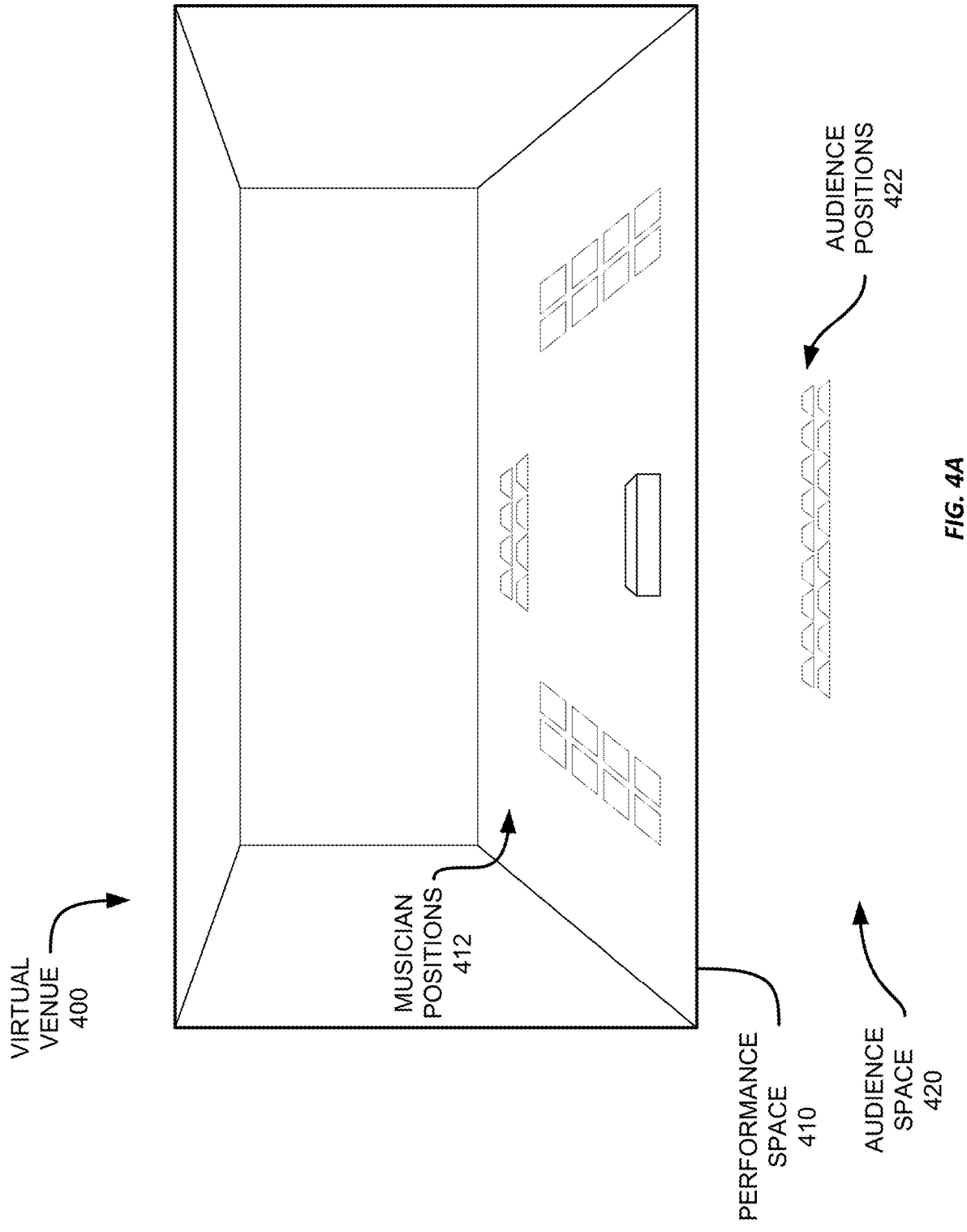
FIGS. 4A-4B show an example virtual venue and participant positions for music collaboration using virtual conferencing.
Figure 4B:
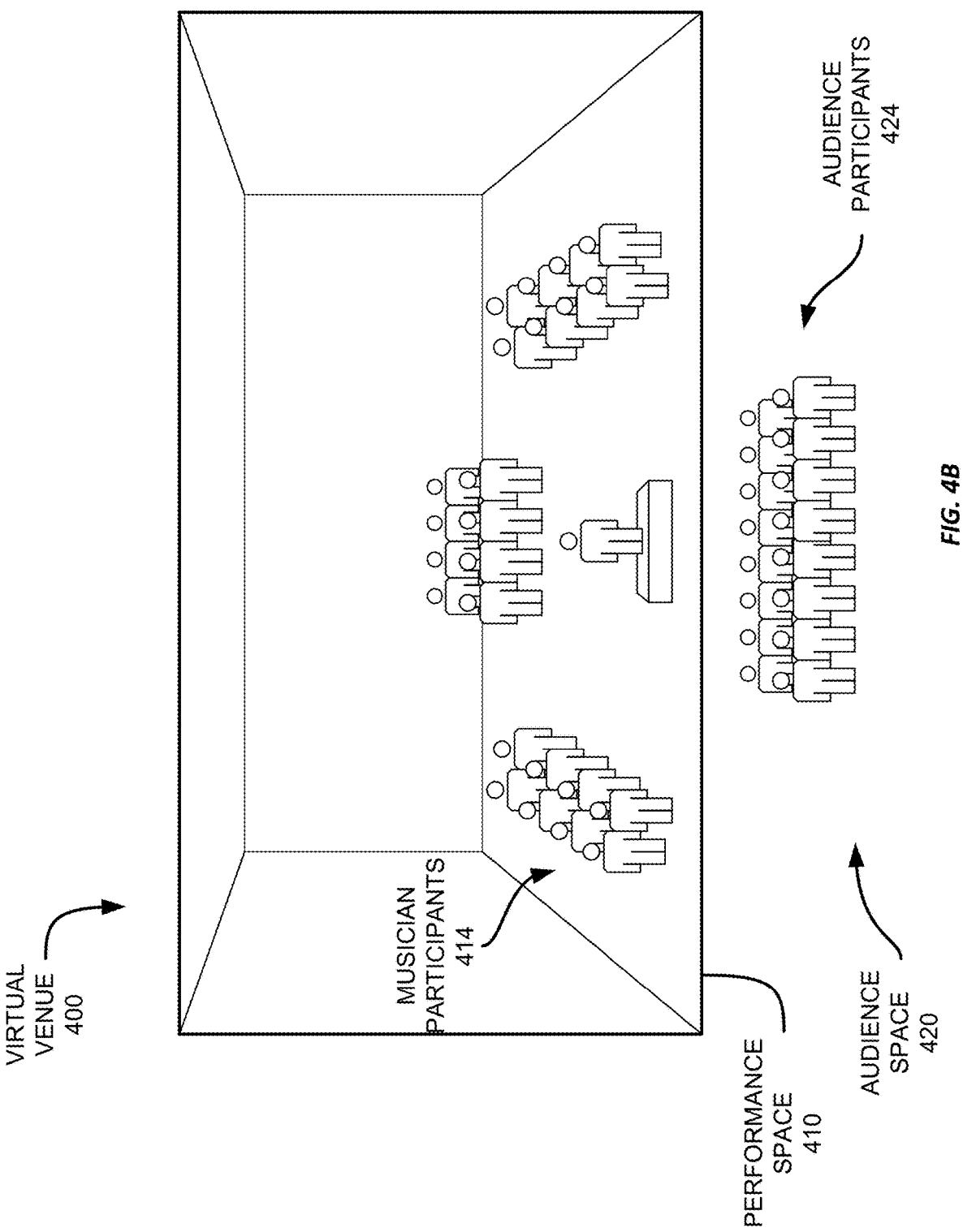

Referring to FIGS. 4A-4B, FIG. 4A shows an example of a virtual venue 400 for a music collaboration. For example, the host may select an orchestral hall as a virtual venue 400 that includes a performance space 410 and an audience space 420. As shown in FIG. 4, the performance space 410 has a number of musician positions 412 to which musician participants in the music collaboration may be assigned, as well as a location for a conductor, band leader, or similar. Depending on the configuration of the music collaboration, the host may assign the musicians to the musician positions 412, though in some examples, the assignments may be made by the musicians. The assignments may be made by selecting options available within a GUI provided by client software executed by the host's or other participant's client device 330, 340*a-n*, or the host or another participant may upload a document or other information that includes the assignments.

In addition, audience participants may be assigned to different audience positions 422 in the audience space 420. The assignments may be made by the host or the audience members may select their desired audience positions. As discussed above, audience positions 422 may accommodate only a single audience member or, in some examples, multiple audience members may be assigned to the same audience position. In examples where audience members have purchased tickets to the performance, they may be assigned based on the ticket they purchased.

As mentioned above, some examples may allow musicians who are not part of the performance to experience playing with the orchestra (or other musical group). These musicians may be assigned to a musician position where they can experience the music collaboration as a musician, however, their audio stream is not provided as a musician audio stream to other participants in the music collaboration. Instead, the musician may play along with the other musicians, but only have the personal experience of doing so without interfering with the musical performance for the audience or other musicians.

Referring now to FIG. 4B, FIG. 4B shows the virtual venue 400 after host has assigned musician participants 414 and audience participants 424 to musician and audience positions 412, 422, respectively. Each participant may be presented with the view of the virtual venue 400 shown in the FIG. 4B, or the virtual venue may be rendered from the perspective of the respective participant's assigned position. Thus, a musician may view the virtual venue from their assigned position within the performance space 410. However, such perspective is not required.

Referring again to FIG. 3B, when a participant joins a virtual conference that is configured as a music collaboration, their client device 330, 340*a-n* employs the music collaboration system 352 provided by the virtual conferencing application 350 to process audio streams received from other participants in the music collaboration. The music collaboration system 352 processes received audio streams to create spatialized audio streams that appear to originate from different points in space with respect to the user of the client device 330. And while this example shows client device 330, other client devices 340*a-n* can provide music collaboration systems 352 as well. To generate spatialized audio streams based on the received audio streams, the music collaboration system 352 obtains various acoustic information and uses it to generate one or more transfer functions that can be used to generate spatialized audio for the music collaboration.

Figure 5:
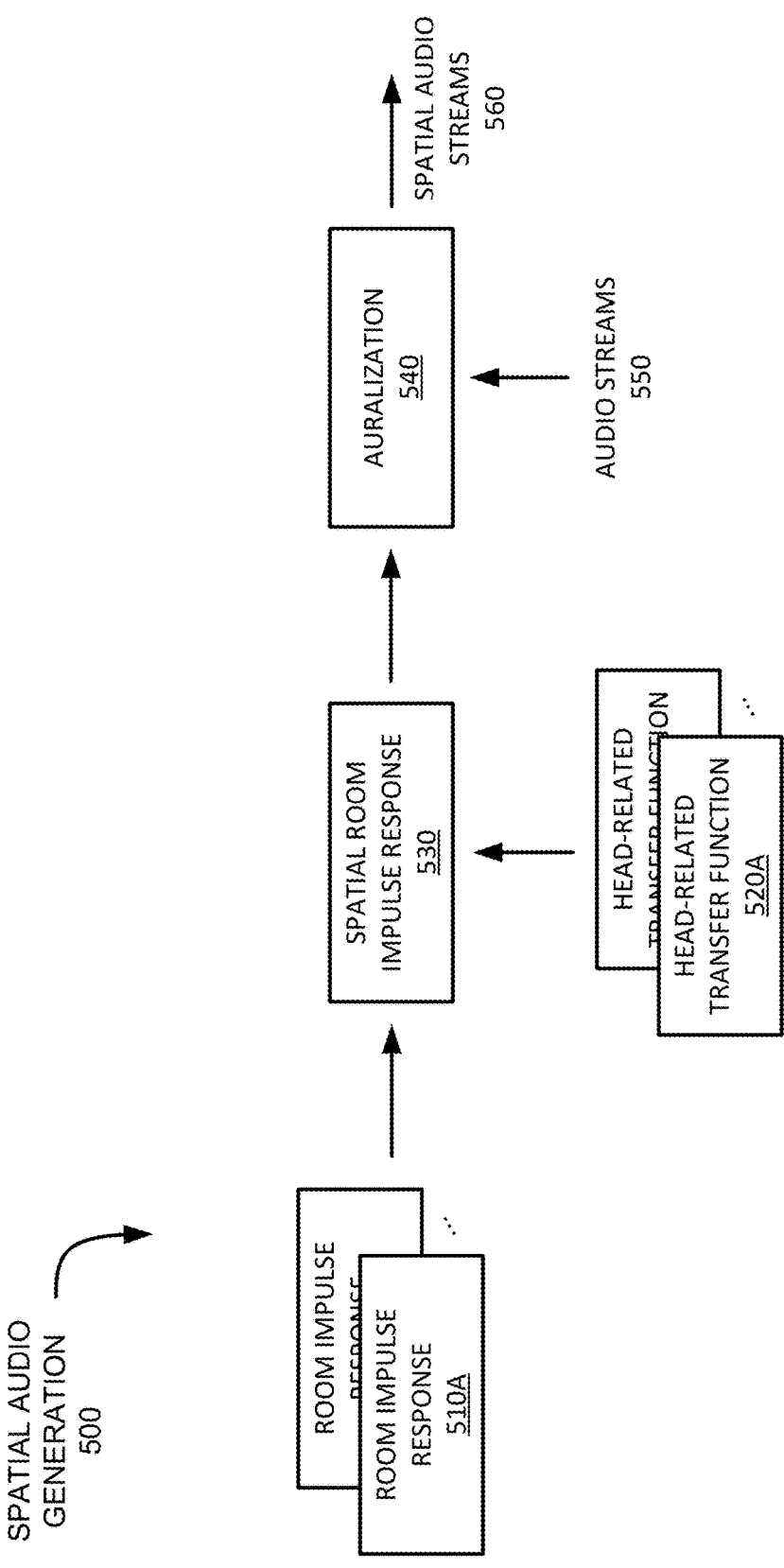
FIG. 5 shows an example spatial audio generation system suitable for use with example systems and methods of music collaboration using virtual conferencing.

Referring now to FIG. 5, FIG. 5 shows an example of spatial audio generation that can be employed by a music collaboration system 352. To generate spatial audio streams 560 from received audio streams 550, the music collaboration system 352 obtains information describing the virtual venue 400, such as its dimensions, scene geometry (such as virtual objects within the venue and the shape of features within the venue), sound propagation information (such as sound absorption or reflection characteristics), or one or more room impulse response (each an "RIR") 510A-N. A RIR can be generated based on a simulation of sound propagation within the virtual venue 400 using techniques such as finite element analysis, a boundary element analysis, finite different time domain analysis, ray tracing, imagesource analysis, or any other suitable technique. In some examples, an RIR can be determined based on measurement of actual sound propagation within a real venue that has been mapped into the virtual venue, such as by using the Maxim Length Sequence (MLS), the sweep signal, or impulse signal as the exciting signal and positioning speakers and microphones within the real venue to measure the RIR. In some examples, the music collaboration system 352 can generate RIRs based on received virtual venue information by simulating sound propagation, though in some examples, it may receive a corresponding RIR from the virtual conference provider or a third party, which could be another participant in the music collaboration.

In addition to the virtual venue information, the music collaboration system 352 obtains one or more sets of head-related transfer functions (each an "HRTF") 520A-M. Convolving sound with HRTFs changes the apparent location of a sound source with respect to a user. Each HRTF in a set adjusts input audio based on the virtual location of a particular audio source with respect to the listener. In some examples, the selection of HRTFs can also be changed based on the pose of the listener's head. Thus, depending on the location of an audio source with respect to the listener (and potentially based on the listener's head pose), a particular HRTF can be selected from the set of HRTFs and used to generate spatialized audio streams for the listener.

Each HRTF in a set of HRTFs can be generated according to any suitable technique. For example, they can be generated empirically by positioning microphones at the entrance of a person's ear canals and playing exciting signals at various locations within a space. The received sound at each microphone, as well as the sound source, can then be used to calculate the HRTF. By moving the sound source to different locations, multiple different HRTFs can be generated. Further, HRTFs can be interpolated for locations between the empirically generated HRTFs using any suitable interpolation technique. For example, spherical harmonics can be used for HRTF interpolation, such as by using the following spherical harmonic basis functions:

$$Y_{nm}(\phi, \theta) = \sqrt{\frac{(2n+1)}{4\pi}} \, P_n^m(\sin(\theta)), \text{ for } m = 0 \tag{1}$$

$$Y_{nm}(\phi, \theta) = \sqrt{\frac{(2n+1)}{2\pi} \frac{(n-|m|)!}{(n+|m|)!}} \, P_n^m(\sin(\theta))\cos(m\phi), \text{ for } m > 0$$

$$Y_{nm}(\phi, \theta) = \sqrt{\frac{(2n+1)}{2\pi} \frac{(n-|m|)!}{(n+|m|)!}} \, P_n^{|m|}(\sin(\theta))\sin(|m|\phi), \text{ for } m < 0$$

In the equation above, $$P_n^m$$

represents the associated Legendre polynomial of order n and degree m. An arbitrary continuous spherical function $f(\phi, \theta)$ can be expanded as:

$$f(\phi, \theta) = \sum_{n=0}^{P} \sum_{m=-n}^{n} Y_{nm}(\phi, \theta) C_{nm} \tag{2}$$

In the equation above, $C_{nm}$ is the spherical harmonic coefficients. For arbitrary measurement grids, the spherical harmonic coefficients can be obtained by least-squares estimation:

$$\hat{c} = \left(Y^T Y\right)^{-1} Y^T f, \text{ given } f = Yc \tag{3}$$

By obtaining the spherical harmonic coefficients, HRTFs can be interpolated in arbitrary spatial directions by feeding the coefficients into the equation (2) above.

Alternatively, HRTFs can be generated based on acoustic simulation or statistical modeling methods, similar to those discussed above with respect to the RIRs.

The music collaboration system 352 obtains one or more sets of HRTFs, such as from the virtual conference provider 310 or they may be pre-installed with the music collaboration system 352. The music collaboration system 352 then convolves the HRTF with the RIR to generate a spatial room impulse response ("SRIR") 530. Similar to RIR or HRTF measurement, the set of SRIRs could also be measured directly in real concert halls. The SRIR is then used at an auralization step to filter the sounds received from the incoming audio streams from other participants in the music collaboration and to generate corresponding spatial audio streams.

In the case of a single musician who is playing, the auralization step may only employ a single SRIR based on the incoming audio stream from that single musician to generate corresponding spatial audio streams 560. However, if multiple musicians are playing simultaneously, multiple different SRIRs may be used, one corresponding to each of the incoming audio streams. Because the locations of musicians and the audience members tend to be static during a performance, each of the needed SRIRs can be generated based on a participant's location within the venue and the locations of the other musicians before the performance begins or even before the participant joins the music collaboration and may, in some examples, be stored with the parameters describing the virtual venue. Further, while this example spatial audio generation system 500 employs both RIRs and HRTFs, some examples may not use RIRs and may only use HRTFs to generate spatial audio. In some such examples, the spatial audio generation system 500 may provide the HRTF(s) to the auralization step 540 without generating a corresponding SRIR. Also, as discussed above, some examples may not need to generate SRIR by convolving HRTF with RIR. In such cases, the spatial audio generation system 500 may provide the SRIR(s) directly to the auralization step 540 without convolving HRTF(s) with RIR.

Referring again to FIG. 3B, as the client device 330 receives incoming audio streams during a music collaboration, it provides the audio streams to the virtual conferencing application 350, which in turn provides them to the music collaboration system 352 along with information identifying the sources of the audio streams. The music collaboration system 352 employs a spatial audio generation system, such as spatial audio generation system 500, to generate spatialized audio streams for one or more of the received audio streams. The spatialized audio streams are then output by speakers 338*a-b* connected to the client device, such as headphones or desktop speakers.

Figure 6A:
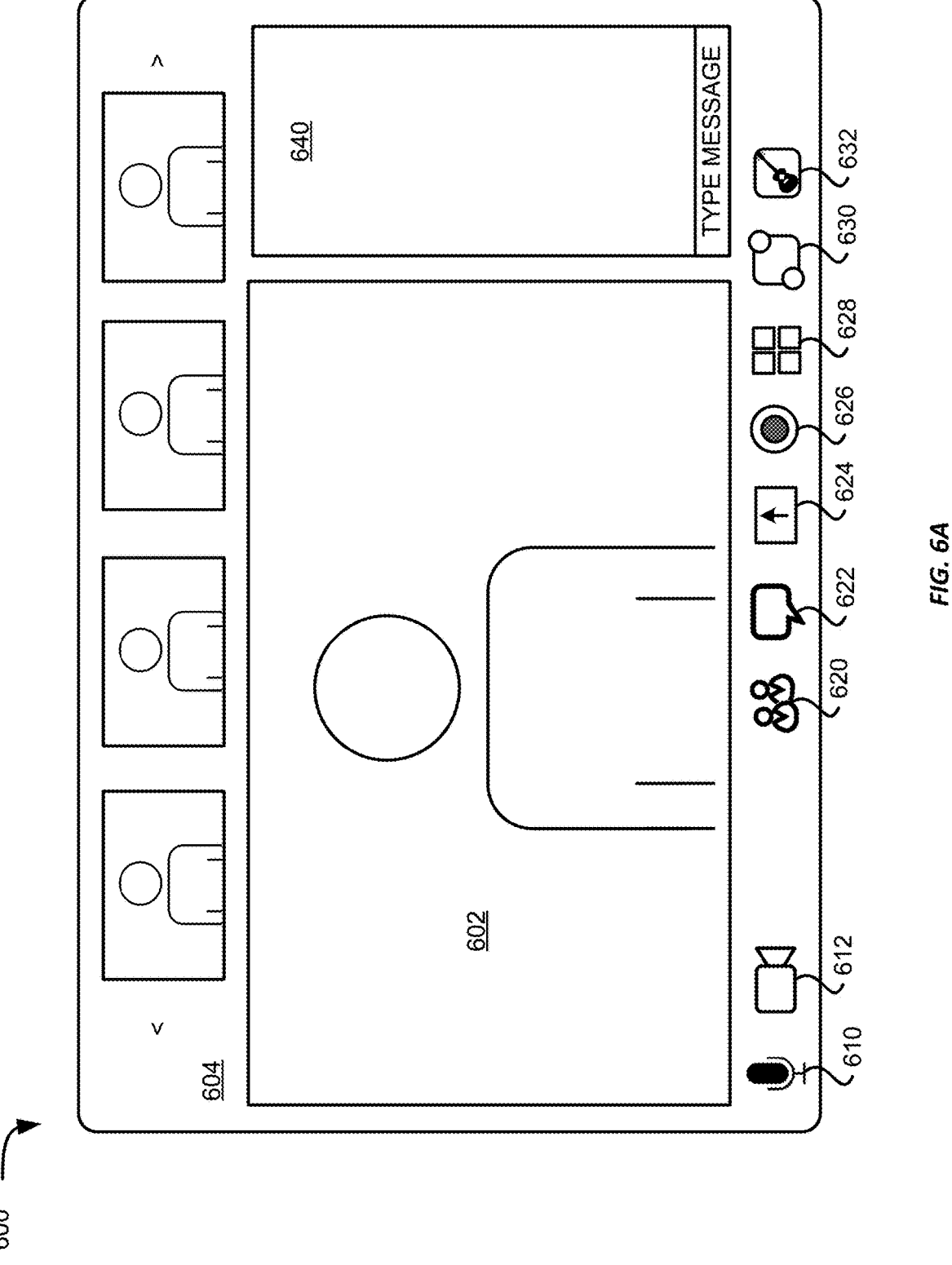
FIGS. 6A-6F show an example graphical user interface usable with systems and methods for music collaboration using virtual conferencing.
Figure 6B:
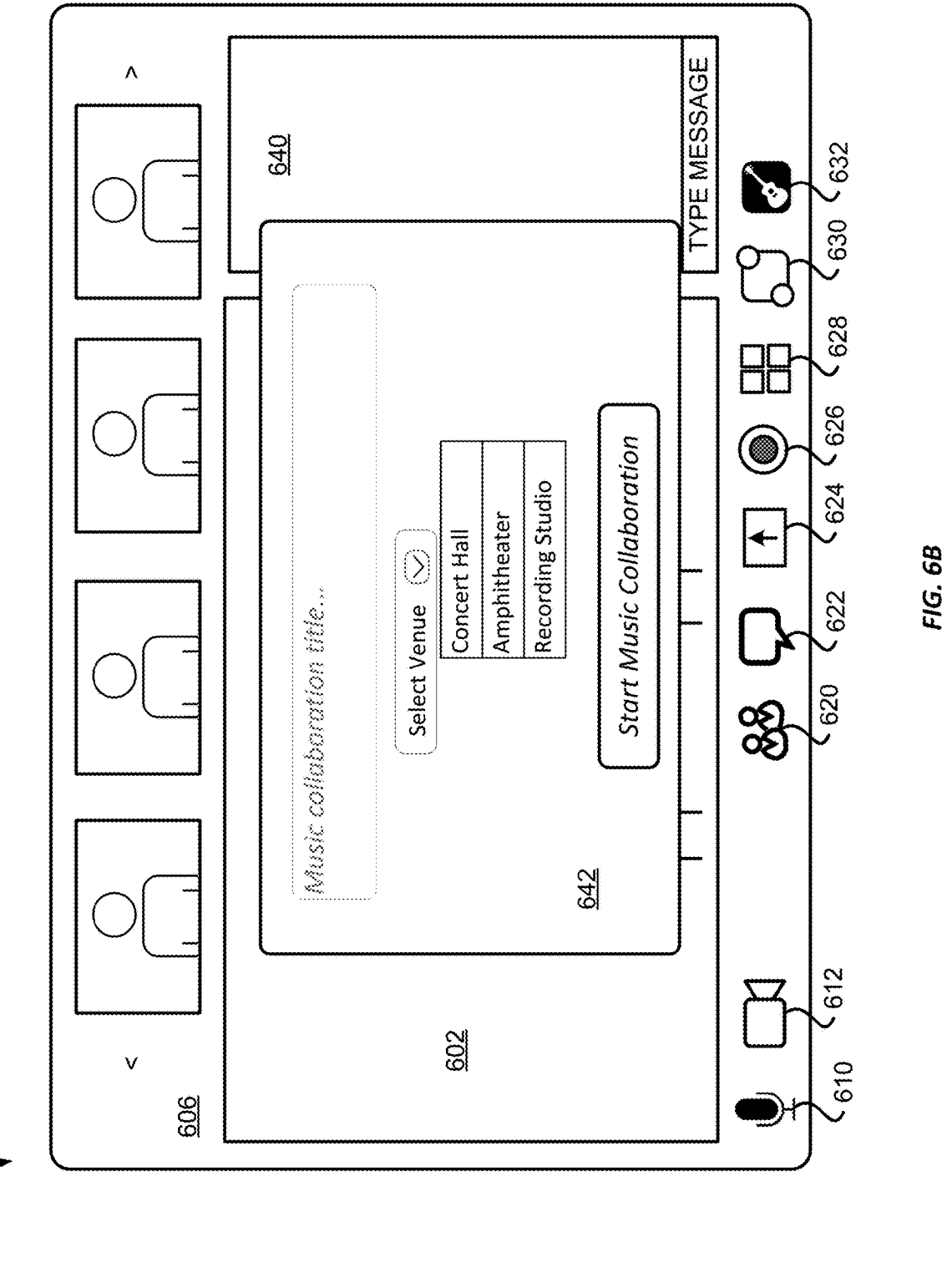

Referring now to FIGS. 6A-6B, FIG. 6A illustrates an example GUI 600 for a software client that can interact with a system for providing music collaboration using virtual conferences. A client device, e.g., client device 330 or client devices 340*a-n*, executes a software client as discussed above, which in turn displays the GUI 600 on the client device's display. In this example, the GUI 600 includes a speaker view window 602 that presents the current speaker in the virtual conference. Above the speaker view window 602 are smaller participant windows 604, which allow the participant to view some of the other participants in the virtual conference, as well as controls ("<" and ">") to let the host scroll to view other participants in the virtual conference. On the right side of the GUI 600 is a chat window 640 within which the participants may exchange chat messages.

Beneath the speaker view window 602 are a number of interactive elements 610-630 to allow the participant to interact with the virtual conference software. Controls 610-612 may allow the participant to toggle on or off audio or video streams captured by a microphone or camera connected to the client device. Control 620 allows the participant to view any other participants in the virtual conference with the participant, while control 622 allows the participant to send text messages to other participants, whether to specific participants or to the entire meeting. Control 624 allows the participant to share content from their client device. Control 626 allows the participant toggle recording of the meeting, and control 628 allows the user to select an option to join a breakout room. Control 630 allows a user to launch an app within the virtual conferencing software, such as to access content to share with other participants in the virtual conference.

In addition to controls 610-630, a music collaboration button 632 is provided by the GUI 600 which allows the user to configure the virtual meeting as a music collaboration. When the music collaboration button 632 is selected, the user may be presented with an option of a venue for the music collaboration, such as selecting from a list of available venues. After selecting a venue, the GUI may change its configuration to provide a music collaboration experience. In addition, when the music collaboration button 632 is selected, the selection and the selected venue may be provided to all of the other participants in the virtual meeting to reconfigure their respective GUIs accordingly.

Referring now to FIG. 6B, FIG. 6B illustrates the GUI 600 after the user has selected the music collaboration option 632 and has been presented with a dialog box 642 to configure the music collaboration. In this example, the user can provide a title for the music collaboration and can select a venue. After entering suitable configuration information, the GUI 600 changes its configuration to provide a GUI for the music collaboration.

Figure 6C:
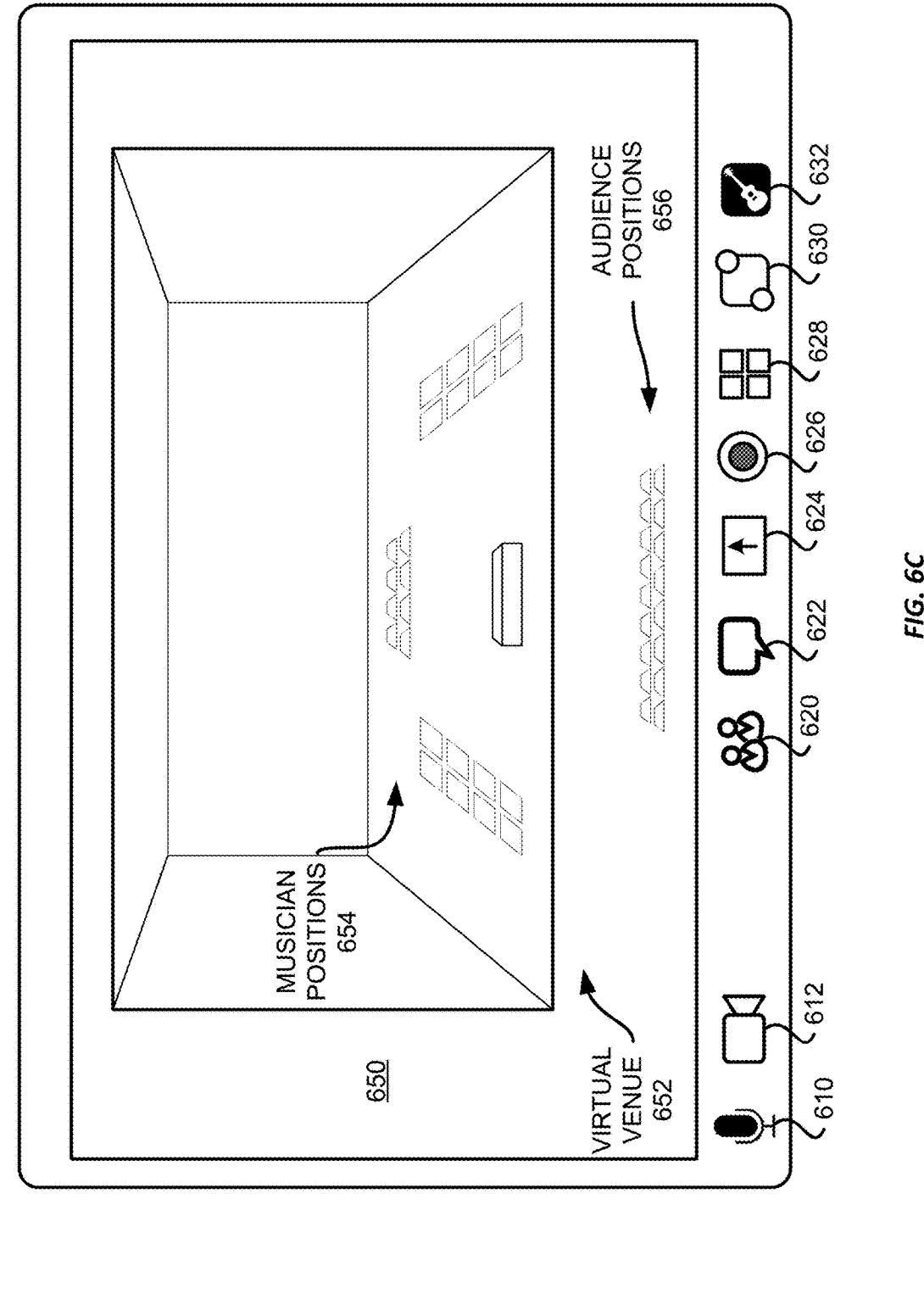

FIG. 6C shows the GUI 600 after switching to a music collaboration mode. In music collaboration mode, the client software replaces the speaker view window 602 with a music collaboration window 650 that provides a graphical representation of the selected virtual venue 652, which is a concert hall in this example. As with the example shown in FIG. 4A, the virtual venue includes multiple musician and audience positions 654, 656. In addition to switching the host's GUI 600 to a music collaboration mode, the other client devices connected to the virtual conference will receive an indication to switch to a music collaboration mode, resulting in their respective GUIs to provide a graphical representation of the selected virtual venue.

Figure 6D:
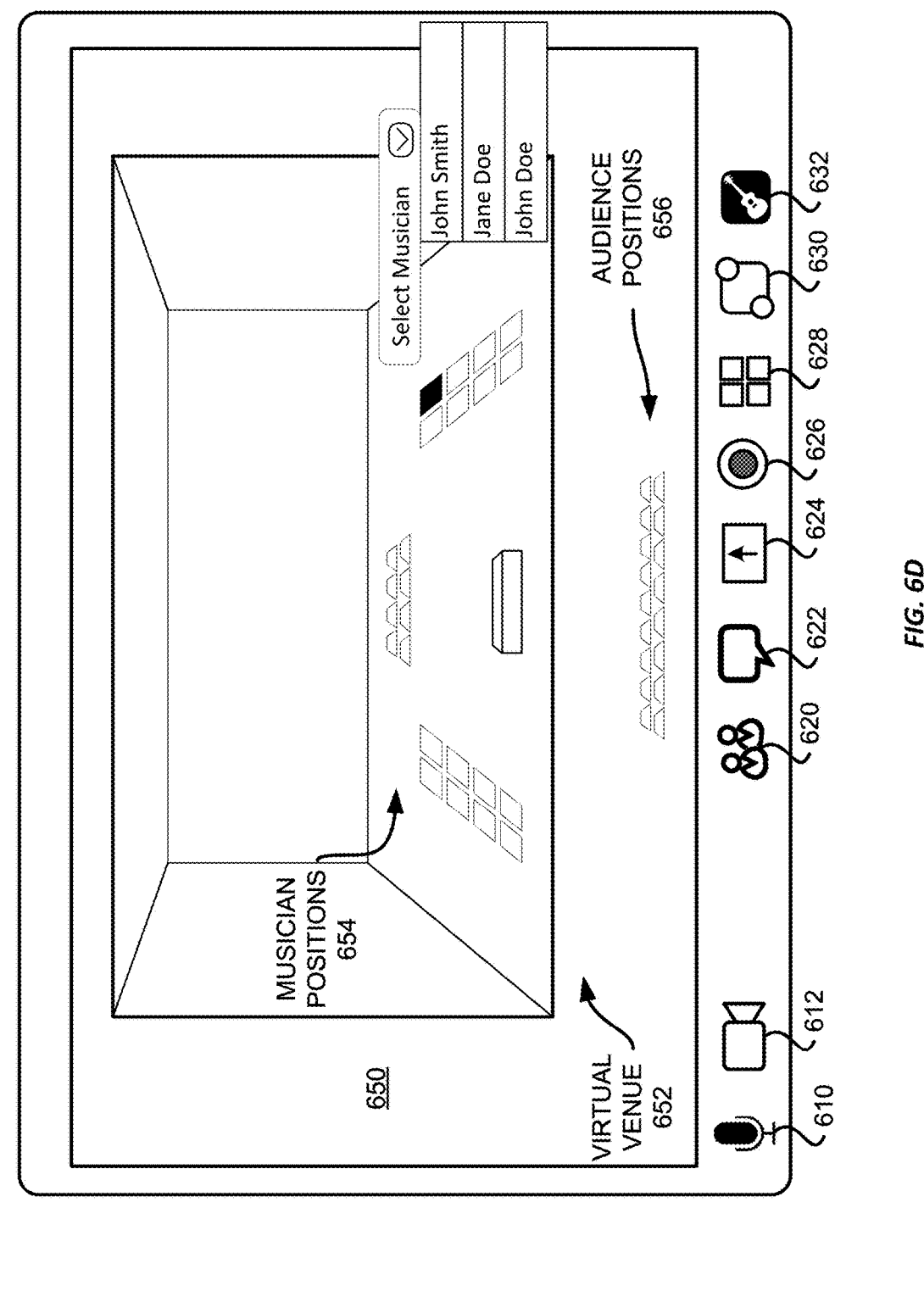

At this time, the host can assign participants to appropriate musician or audience positions 654, 656, as depicted in FIG. 6D. In some examples, the participants themselves can select a desired position, or participants can be assigned a role, such as musician or audience, and be automatically assigned to a particular position.

Referring now to FIG. 6D, in the GUI 600 shown in FIG. 6D, the host of the music collaboration has selected a specific musician position (shaded) and has been presented with an option to select a musician to assign to the selected position. In this example, the host is presented with a drop-down list of available participants, though in some examples, the host may be presented with a list of participants and may select a participant and then select a corresponding position. After a participant is assigned to a position, the client devices within the meeting receive an indication of the assigned participant and the assigned position. Thus, as each participant is assigned, the various client devices are updated with the assignments, which may enable them to provide spatialized audio streams corresponding to the various participants. And while the assignment process is occurring during an on-going virtual conference, in some examples, the host may perform the assignment process before the virtual conference begins, such as based on an invite list for the meeting. The assignments may then be propagated to the participants as they join the meeting or at any time before or during the meeting.

Figure 6E:
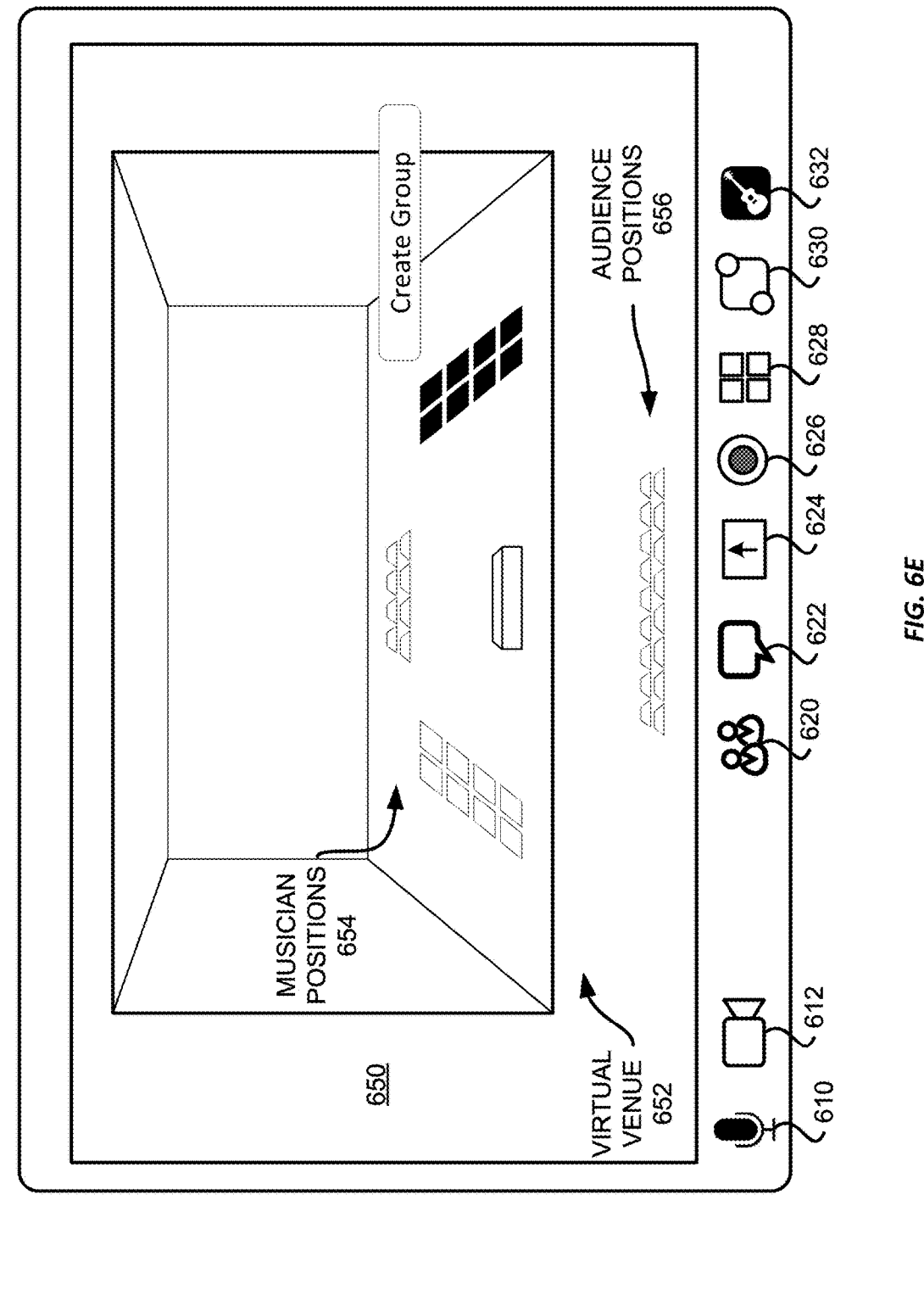

Referring to FIG. 6E, FIG. 6E shows an example of grouping multiple positions. The user has selected multiple musician positions 654 and has selected an option to create a group from those selected musician positions 654. Creating a group creates a single location corresponding to each of the musician positions within the group. Thus, all of the musician positions within the group are assigned a common position, such as at a center based on averaging the locations of each position or centroid of a region containing the selected positions. Such functionality can be used to simplify audio processing at one or more client devices. Received audio streams from musicians within a group can be processed using the same parameters and it may be possible, in some examples, to merge and process all such audio streams at once, rather than individually. In music collaborations with large numbers of musicians, such as for a full band or orchestra, this may substantially reduce the processing demands on the client devices 330, 340*a-n* participating in the music collaboration.

Figure 6F:
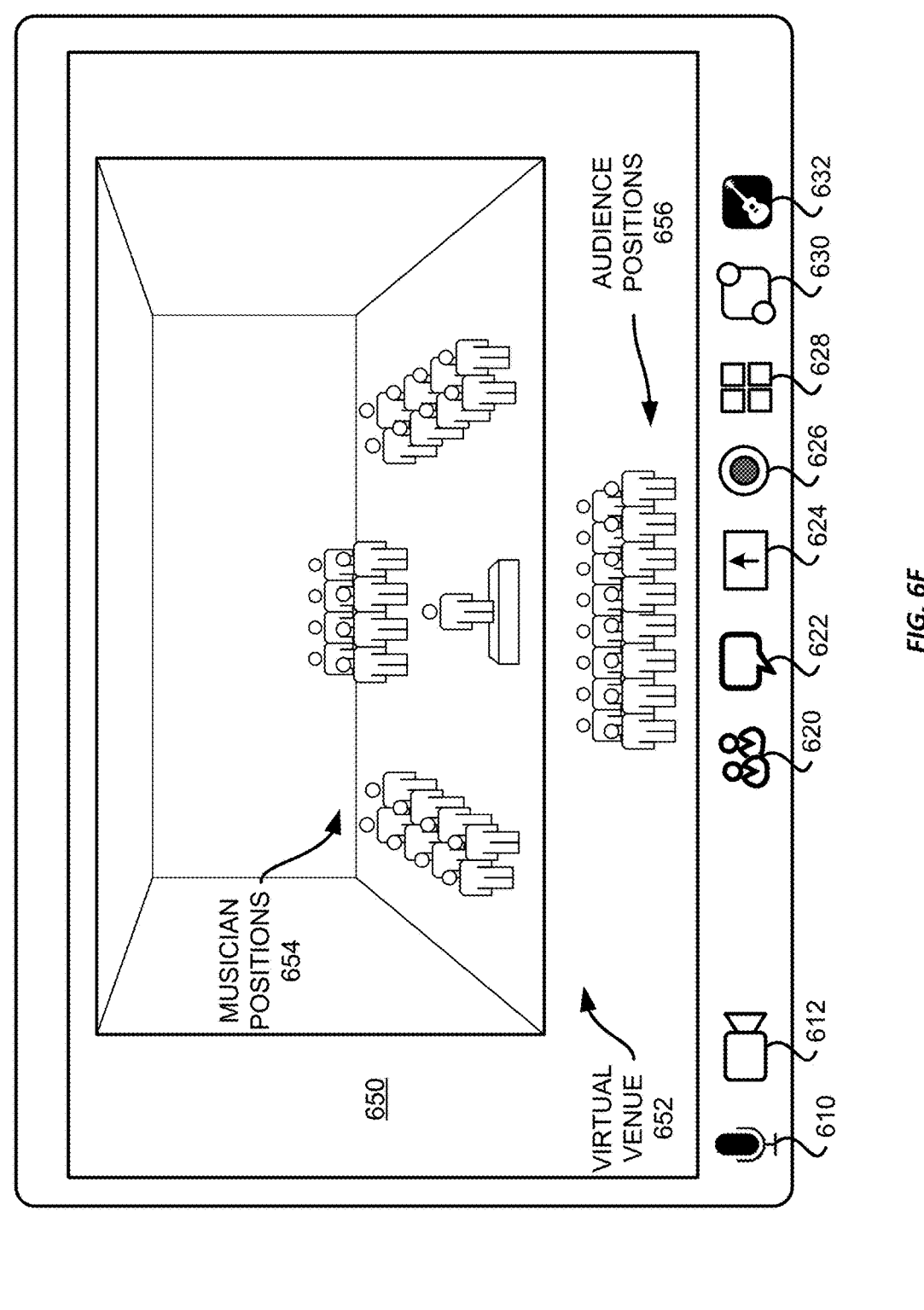

FIG. 6F shows the music collaboration after the participants have been assigned to corresponding musician and audience positions 654, 656. At this time, the various participants have corresponding locations within the virtual venue and each of the client devices 330, 340*a-n* connected to the music collaboration may use the music collaboration system 352 of the virtual conferencing application 350 to provide spatialized audio streams corresponding to the musicians or audience members, generally as discussed above with respect to FIGS. 3A-3B and 5.

Referring now to FIG. 7, FIG. 7 shows an example method 700 for music collaboration using virtual conferencing. The example method 700 will be described with respect to the system 300 shown in FIGS. 3A-3B and 5; however, any suitable system according to this disclosure may be employed, including the example systems 100-200 shown in FIGS. 1-2.

At block 710, a user uses client software 350 to join a virtual conference hosted by a virtual conference provider using a client device 330, generally as described above with respect to FIGS. 1-2 and 3A-B. In this example, the user is the host of the virtual conference, but other participants in the virtual conference may join using client software 350 executed by their own respective client devices 340*a-n* as described above with respect to FIGS. 1-2 and 3A-B.

At block 720, the client software 350 executed by the client device 330 receives a selection to configure the virtual conference as a music collaboration. As discussed above with respect to FIG. 6B, a user may select a music collaboration option 632 within the GUI 600 provided by the client software 350. This may present a dialog box or other option interface to allow the user to change the virtual conference to a music collaboration mode. After receiving the selection, the client device 330 transmits an indication to the virtual conference provider 310 to use a music collaboration mode. The virtual conference provider 310 may then provide an indication to the other participants to change to a music collaboration mode.

In some examples, the selection for a music collaboration may occur when the user initially configures the virtual conference, but before any invitations are sent to participants. For example, a user may interact with virtual conferencing software to schedule a new virtual conference in the future. As a part of scheduling the virtual conference, the user may select an option to configure the virtual conference as a music collaboration and may also select a corresponding venue. Thus, at a later time, when the user starts the conference and joins it, the virtual conference may already be operating in a music collaboration mode.

At block 730, the client software 350 receives assignments of one or more participants to positions within a virtual venue. As discussed above with respect to FIG. 6D, the user may select musician or audience positions 654, 656 and assign individual participants to positions within the virtual venue 652. Each position 654, 656 has a corresponding location within the virtual venue, such as a coordinate in three dimensions (e.g., an (x, y, z) coordinate). Thus, when a participant is assigned to a position, the virtual conference software may receive or associate the corresponding position information with one or more streams received from the participant. In some examples, these selections may be made locally, such as by a participant self-selecting a position or by the host assigning participants to different positions. However, in some examples, the assignments may be received from a remote client device or from the virtual conference provider 310. For example, as the host assigns participants to different positions, the participants may receive those assignments and store them for use when generating spatialized audio streams. Similarly, if any position assignments were pre-defined before the music collaboration started, the participants may receive those pre-defined position assignments when they join the virtual conference or after it is configured as a music collaboration.

In some examples, a user may select a particular position that is already occupied by a musician. In some examples, the user may be configured as a "silent" musician, which can enable the user to participate in the music collaboration as though they are a musician and experience the audio streams from the perspective of a musician. However, their audio streams may not be provided to the other participants in the music collaboration. This can allow participants to experience what it is like to perform within a band, orchestra, or other group of musicians.

In some examples, a user may group multiple positions together to establish a single common location corresponding to each position in the group, such as described above with respect to FIG. 6E. Any positions may be grouped together, though it may be desirable to only group positions that are spatially near each other within the virtual venue 652.

At block 740, the user's client software 350 receives audio streams 370 associated with musicians within the music collaboration. As discussed above with respect to FIGS. 1-2, 3A, and 3B, each participant in the virtual conference may provide audio streams generated by a microphone connected to the respective participant's client device.

At block 750, the client software 350 provides the received audio streams 370 to the music collaboration system 352. As discussed above, the virtual conferencing application 350 uses a music collaboration system 352 to generate spatialized audio streams based on the relative virtual positions of the respective musicians and the respective audio streams. In other examples, the virtual conference provider 310 may have one or more music collaboration systems 352 on one or more servers operated by the virtual conference provider 310. In some such examples, the virtual conference provider 310 may provide audio streams received from the various participants in the music collaboration to one or more of the music collaboration systems to generate spatial audio streams for participants in the music collaboration, similarly to the music collaboration system 352 executed by the video conferencing application 350.

At block 760, the music collaboration system 352 generates spatialized audio streams based on the relative virtual positions of the respective musicians and the respective audio streams. As discussed above, when a virtual conference is configured as a music collaboration, participants in the conference may be assigned virtual positions within a virtual venue representing a virtual three-dimensional space, such as the virtual venue 652 shown in FIGS. 6A-6F. Each virtual position 654, 656 may be associated with a location within the virtual venue 652 and may have a corresponding (x, y, z)-coordinate within the virtual three-dimensional space. The client device 330 can provide these virtual positions 654, 656 to the music collaboration system 352, which can store them and use them to generate spatialized audio streams.

To generate the spatialized audio streams, the music collaboration system 352 receives an audio stream from another participant and determines a corresponding location within the virtual venue. It can then select a suitable HRTF based on the relative positions of the assigned location of the user of the client device 330 and the assign location of the source of the audio stream, generally as described above with respect to FIG. 5. In addition, if the virtual venue has one or more corresponding RIRs, the music collaboration system 352 can generate an SRIR and process the received audio stream using the SRIR to generate corresponding spatialized audio streams by convolving the RIR(s) and the HRTF and applying the SRIR to the received audio stream. If no RIR is used, the music collaboration system 352 can generate the spatialized audio streams using the HRTF. If the SRIR has been directly provided, the music collaboration system 352 can generate the spatialized audio streams using the provided SRIR. It should be appreciated that a user may determine whether to employ an RIR or not, such as to reduce a processing burden on their client device. Further, it should be appreciated that the particular HRTF used for a participant may change if the client device 330 detects a change in its user's pose, such as based on the user turning their head. Pose detection may be performed based on video captured using a camera 334 connected to the client device 330. Though, if pose detection is not employed, an HRTF may be selected based on the assumption that the user is looking directly at the camera or computer screen.

Further, because the client device 330 may receive audio streams from multiple different participants, it can generate different sets of spatialized audio streams based on the received audio streams and corresponding HRTFs and, if available, one or more RIRs, or SRIRs in some examples. These multiple sets of spatialized audio streams may then be combined and output to the user of the client device 330. And while this step is described as being performed at a client device 330, it could be performed by the virtual conference provider 310 in some examples.

In some examples, the music collaboration system 352 may use groups of virtual positions to provide spatialized audio streams. As discussed above with respect to FIG. 6E, the host may define one or more groups of participant positions 654, 656 to associate a single location with the group. Thus, all audio streams received from the participants in the group may be combined and then processed as a single received audio stream to generate corresponding spatialized audio streams as discussed above. And while the example described with respect to FIG. 6E involved the host creating groups, in some examples individual participants can decide whether to create groups of positions, such as to reduce processing requirements on their own client device, without requiring all participants to employ groups. This can allow different participants to create different groups of positions to generate customized spatialized audio streams. Alternatively, a participant may choose to make no groups and instead to process each individual audio stream separately.

At block 770, the client device 330 outputs the spatialized audio streams to the user, such as via speakers 338*a-b*, which may be speakers placed on the user's desk or in the room with the user or that may be part of a headset worn by the user.

The method 700 may then return to block 740 as audio streams continue to be received from other participants within the music collaboration. It should be appreciated that block 750 may only need to be performed once per other participant, assuming participants' positions remain static during the course of the music collaboration. However, if participants may move within the virtual venue 652, then the music collaboration system 352 may perform block 750 multiple times based on various participants movements. It should also be appreciated that the method 700 may be used both by participants who are audience members as well as participants who are musicians. Thus, each participant within the music collaboration, regardless of their role, may generate and output spatialized audio streams.

Figure 8:
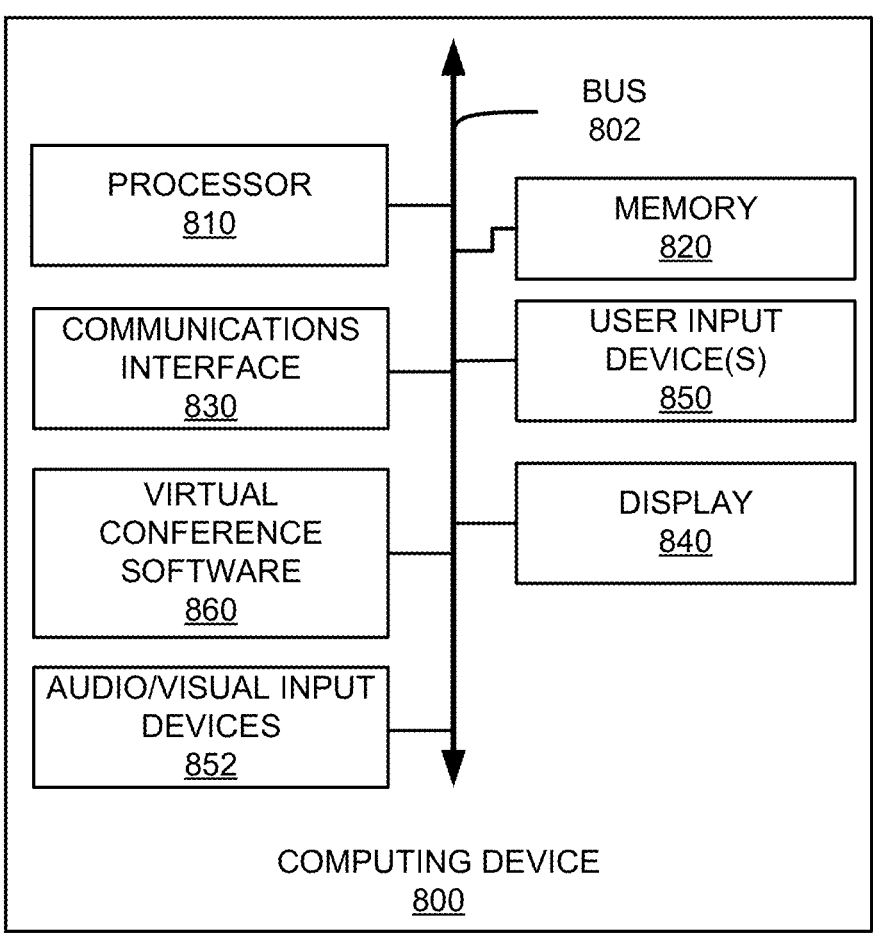
FIG. 8 shows an example computing device suitable for use with example systems and methods for music collaboration using virtual conferencing.

Referring now to FIG. 8, FIG. 8 shows an example computing device 800 suitable for use in example systems or methods for music collaboration using virtual conferencing according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for music collaboration using virtual conferencing according to different examples, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a virtual conferencing application 860 to enable a user to join and participate in one or more virtual spaces or in one or more conferences, such as a conventional conference or webinar or music collaboration, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by a client device, audio streams from a plurality of musicians in a virtual conference hosted by a virtual conference provider, each musician assigned to a virtual position within a virtual space established by the virtual conference, each audio stream corresponding to an individual musician of the plurality of musicians, the client device associated with a participant in the virtual conference, the participant having a participant virtual position within the virtual space;
receiving, by the client device from the virtual conference provider, the respective assigned virtual position for each musician and the participant virtual position within the virtual space;
determining relative virtual positions of each musician of at least a subset of the plurality of musicians in the virtual conference with respect to the participant virtual position based on the received assigned virtual positions for the musicians;
generating a plurality of spatialized audio streams based on the relative virtual positions of the respective musicians and the respective audio streams; and
outputting the spatialized audio streams.

2. The method of claim 1, further comprising:
selecting head-related transfer functions ("HRTF") from a set of HRTFs based on the relative virtual positions of the musicians and the participant virtual position; and
wherein generating the plurality of spatialized audio streams is further based on the selected HRTFs.

3. The method of claim 1, further comprising:
generating one or more groups of musicians based on the virtual positions of the musicians;
associating each group of the one or more groups with a respective group virtual position within the virtual space; and
wherein:
determining relative virtual positions of each musician in the virtual conference with respect to the participant's head comprises determining relative group virtual positions of each group of musicians in the virtual conference based on the respective group virtual position with respect to the participant virtual position, and
generating a plurality of spatialized audio streams is further based on the relative group virtual positions.

4. The method of claim 3, further comprising:
selecting head-related transfer functions ("HRTF") from a set of HRTFs based on the virtual positions of the musicians or the one or more groups and the participant virtual position; and
wherein generating the plurality of spatialized audio streams is further based on the selected HRTFs.

5. The method of claim 1, further comprising:
determining one or more audio effects based on the virtual space; and
wherein generating the plurality of spatialized audio streams comprises applying the one or more audio effects to the received audio streams.

6. The method of claim 5, wherein the virtual space comprises a concert hall, and wherein the one or more audio effects comprises a reverberation based on virtual physical characteristics of the concert hall.

7. The method of claim 1, wherein the participant is a first musician of the plurality of musicians.

8. The method of claim 3, further comprising:
receiving, from a camera connected to the client device, a video stream;
determining a pose of the participant's head in the video stream;
selecting one or more head-related transfer functions ("HRTF") from a set of HRTFs based on the virtual positions of the musicians or the one or more groups, the participant virtual position, and the pose of the participant's head; and
wherein generating the plurality of spatialized audio streams is further based on the selected one or more HRTFs.

9. The method of claim 1, wherein the participant is a member of an audience of the plurality of musicians.

10. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
receive, by a client device, audio streams from a plurality of musicians in a virtual conference hosted by a virtual conference provider, each musician assigned to a virtual position within a virtual space established by the virtual conference, each audio stream corresponding to an individual musician of the plurality of musicians, the client device associated with a participant in the virtual conference, the participant having a participant virtual position within the virtual space;
receive, by the client device from the virtual conference provider, the respective assigned virtual position for each musician and the participant virtual position within the virtual space;
determine relative virtual positions of each musician of at least a subset of the plurality of musicians in the virtual conference with respect to the participant virtual position based on the received assigned virtual positions for the musicians;
generate a plurality of spatialized audio streams based on the relative virtual positions of the respective musicians and the respective audio streams; and
output the spatialized audio streams.

11. The system of claim 10, wherein the one or more processors are configured to execute further processor-executable instructions stored in the non-transitory computer-readable medium to:

select head-related transfer functions ("HRTF") from a set of HRTFs based on the relative virtual positions of the musicians and the participant virtual position; and generate the plurality of spatialized audio streams further based on the selected HRTFs.

12. The system of claim 10, wherein the one or more processors are configured to execute further processor-executable instructions stored in the non-transitory computer-readable medium to:

generate one or more groups of musicians based on the virtual positions of the musicians;

associate each group of the one or more groups with a respective group virtual position within the virtual space;

determine relative group virtual positions of each group of musicians in the virtual conference based on the respective group virtual position with respect to the participant virtual position; and generate the plurality of spatialized audio streams further based on the relative group virtual positions.

13. The system of claim 12, wherein the one or more processors are configured to execute further processor-executable instructions stored in the non-transitory computer-readable medium to:

select head-related transfer functions ("HRTF") from a set of HRTFs based on the virtual positions of the musicians or the one or more groups and the participant virtual position; and generate the plurality of spatialized audio streams further based on the selected HRTFs.

14. The system of claim 10, wherein the one or more processors are configured to execute further processor-executable instructions stored in the non-transitory computer-readable medium to:

determine one or more audio effects based on the virtual space; and apply the one or more audio effects to the received audio streams.

15. The system of claim 12, wherein the one or more processors are configured to execute further processor-executable instructions stored in the non-transitory computer-readable medium to:

receive, from a camera, a video stream;

determine a pose of the participant's head in the video stream;

select one or more head-related transfer functions ("HRTF") from a set of HRTFs based on the virtual positions of the musicians or the one or more groups, the participant virtual position, and the pose of the participant's head; and generate the plurality of spatialized audio streams further based on the selected one or more HRTFs.

16. A non-transitory computer-readable medium comprising processor-executable instructions configured to cause one or more processors to:

receive, by a client device, audio streams from a plurality of musicians in a virtual conference hosted by a virtual conference provider, each musician assigned to a virtual position within a virtual space established by the virtual conference, each audio stream corresponding to an individual musician of the plurality of musicians, the client device associated with a participant in the virtual conference, the participant having a participant virtual position within the virtual space;

receive, by the client device from the virtual conference provider, the respective assigned virtual position for each musician and the participant virtual position within the virtual space;

determine relative virtual positions of each musician of at least a subset of the plurality of musicians in the virtual conference with respect to the participant virtual position based on the received assigned virtual positions for the musicians;

generate a plurality of spatialized audio streams based on the relative virtual positions of the respective musicians and the respective audio streams; and output the spatialized audio streams.

17. The non-transitory computer-readable medium of claim 16, further comprising processor-executable instructions configured to cause one or more processors to:

select head-related transfer functions ("HRTF") from a set of HRTFs based on the relative virtual positions of the musicians and the participant virtual position; and generate the plurality of spatialized audio streams based on the selected HRTFs.

18. The non-transitory computer-readable medium of claim 16, further comprising processor-executable instructions configured to cause one or more processors to:

generate one or more groups of musicians based on the virtual positions of the musicians;

associate each group of the one or more groups with a respective group virtual position within the virtual space;

determine relative group virtual positions of each group of musicians in the virtual conference based on the respective group virtual position with respect to the participant virtual position; and generate the plurality of spatialized audio streams further based on the relative group virtual positions.

19. The non-transitory computer-readable medium of claim 18, further comprising processor-executable instructions configured to cause one or more processors to:

select head-related transfer functions ("HRTF") from a set of HRTFs based on the virtual positions of the musicians or the one or more groups and the participant virtual position; and generate the plurality of spatialized audio streams further based on the selected HRTFs.

20. The non-transitory computer-readable medium of claim 16, further comprising processor-executable instructions configured to cause one or more processors to:

determine one or more audio effects based on the virtual space; and apply the one or more audio effects to the received audio streams.

\* \* \* \* \*